United States Patent

[11] 3,569,820

[72] Inventor Robert K. Nishimuta
       Pomona, Calif.
[21] Appl. No. 801,392
[22] Filed Feb. 24, 1969
[45] Patented Mar. 9, 1971
[73] Assignee Bourns, Inc.

[54] PROXIMITY DETECTION SYSTEM
     5 Claims, 5 Drawing Figs.
[52] U.S. Cl. .................................................. 323/51,
                                        336/130, 340/199
[51] Int. Cl. .................................................. H02p 13/10
[50] Field of Search .......................................... 323/51, 90,
                     113; 336/30, 45, 20, 130, 199; 340/199, 201

[56] References Cited
       UNITED STATES PATENTS
3,100,889  8/1963  Cannon ........................ 340/199X
3,210,746  10/1965  Clapp ........................... 340/199
3,232,115  2/1966  Bennett et al. .................. 336/130X
3,477,027  11/1969  Jablonski ...................... 323/51

*Primary Examiner*—James D. Trammell
*Assistant Examiner*—A. D. Pellinen
*Attorney*—Fritz B. Peterson ABSTRACT: A system to replace directly actuated electric switches in hazardous or other adverse environments, for example aircraft landing-gear-actuated switches, in which system movement of a magnetic target relative to an alternating magnetic field causes a phase shift or inversion in an AC signal which change is detected by a phase detector the output of which controls solid-state electric switches or controllers which may be remote from the adverse environment.

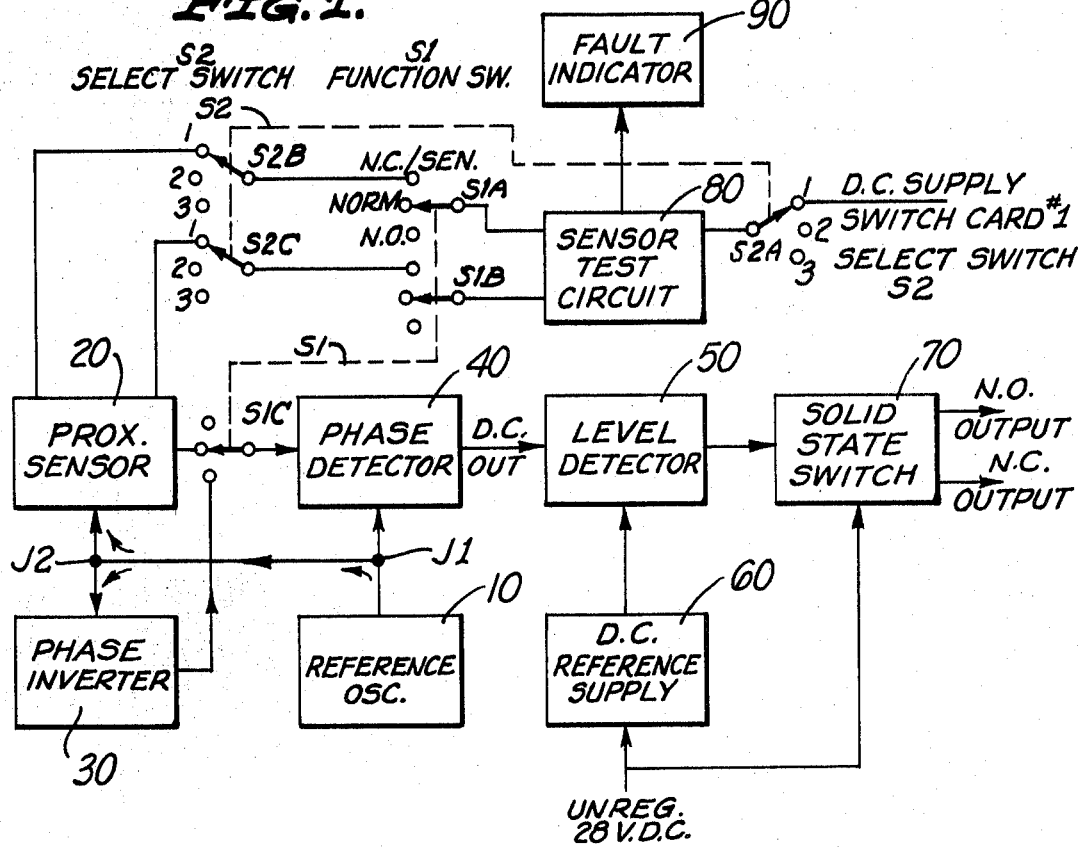
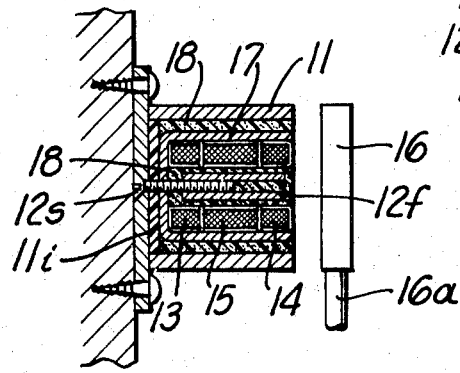
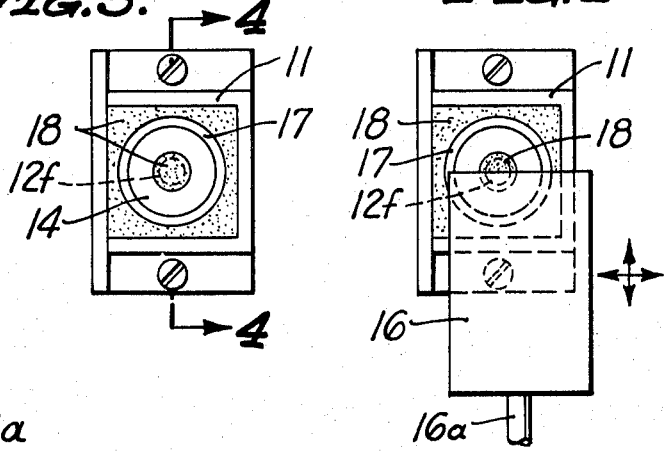
INVENTOR
ROBERT K. NISHIMUTA
BY

INVENTOR
ROBERT K. NISHIMUTA

PROXIMITY DETECTION SYSTEM

BACKGROUND OF THE INVENTION

Heretofore, for providing at a control or operator's station, such as, for example, at the pilot's or flight engineer's stations in large aircraft, signals indicating the status of mechanisms such as the position of landing gear elements, it has been the practice to utilize electric switch means positioned to be directly actuated by an element of the mechanism as the element approached or reached a particular position. Switches of the type known in the trade by the title "microswitch" were commonly used, disposed to be actuated by a mechanical member that either was a movable component of the mechanism or was affixed to such a component. Serious objections to the prior-art arrangements and devices are that they are subject to mechanical wear, are located generally in an adverse environment for electrical contacts, and are subject to the deterioration experienced by all operating electric contacts. Further, in many mechanisms in which such electric switches are used to initiate provision of a signal indicative of movement of a part or element to a specific position or attitude, misalignment of a part, caused by stress and/or slight wear of pivots or the like, results in a false or incorrect indication.

SUMMARY OF THE INVENTION

The aforenoted and other undesirable features of the mentioned prior art systems are entirely obviated by the presently described invention, by substituting for the electric switch means a device such as an inductive device having the capacity to effect a shift or reversal of phase of an electric wave incident to movement of a target or like element into or out of proximity to the device. In the exemplary system herein disclosed and chosen to illustrate a preferred physical embodiment of the invention, the phase-shifting or inverting device is a differential transformer. The transformer primary is energized by a AC power, and the relationship between the opposed secondary windings and the target is such that incident upon movement of the target from a relatively remote position to a close-proximity position, the output of the secondary changes (reverses) in phase relative to the voltage wave applied to excite or energize the primary. The exciting voltage wave as a reference wave, and the secondary output wave, are applied to phase-detection means which are effective to produce an output signal (in this example a DC potential) the magnitude of which indicates remoteness, or near proximity, of the target relative to the inductive device. The difference between near-proximity on the one hand, and what is here for convenience termed remote, on the other hand, can be chosen so that wear, misalignment of parts, etc. are of minor or no consequence. Further, no physical contact of parts is required in the transition between remote status and near-proximity status; however, the system remains entirely and effectively operable if such physical contact occurs, since the arrangement and character of elements is readily so chosen that the same result is attained whether or not the target continues movement from near-proximity into actual contact with the means with which it cooperates in effecting phase shift of the waves. In the exemplary illustrated device, remote status of the moving element or target of the sensor is arbitrarily taken to be any distance in excess of 0.125 inch, and near proximity similarly is taken to be any distance less than 0.125 inch, in the constructions wherein a flat face of a target approaches face-to-face the complementary flat face of the inductive device. In those constructions wherein the face of the target moves across the face of the inductive device at a substantially constant distance (e.g., 0.125 inch) from the latter, the target is considered to be proximate to the sensor (inductive device) when a specific selected percentage of the face area of the movable member (such as 45 percent thereof) directly faces the face area of the fixed member. As will be evident to those skilled in the art of inductive sensors, the energized inductive device may be selected to be the moved or movable element, and the magnetic target member the stationary or fixed element; however, to avoid necessity for use of flexible and/or exposed conductors for energization of the inductive device, it is preferred that the target device be the movable element and the inductive member the stationary member. As is evident, in certain special situations, both members may be movable, moving to and from remote status or positions from and to near proximity to each other.

In the present preferred exemplary embodiment of the invention, relative movement of target and sensor elements is attained by stationary mounting of the inductive or sensor element and moving the target. The inductive element is a transformer having a magnetic core with an airgap, an energizable primary, and opposed secondary windings; and the target is a plate of magnetic alloy such as Mumetal. The arrangement of elements and the circuit components and connections are such that with the elements in remote state status, the output of the opposed secondary windings is of a first phase relationship with the primary-exciting AC wave (for example, in phase conjunction); and are such that when the elements come into near-proximity status as defined above, the phase-relationship reverses (phase opposition). The output signal of the opposed secondaries, and the AC signal used to excite and energize the primary winding, constituting, respectively, a sensor signal and a reference signal, are applied to a phase detector. The components and circuit of the phase detector are such that when phase conjunction obtains between the detector input signals, the output signal is negligible (zero, or near zero); and such that when phase opposition obtains in the detector input signals, the detector output signal is a DC potential of appreciable magnitude. The DC detector output signal is fed to a signal level detector wherein, when the signal level is indicative of the attainment of near-proximity status, an output control signal is produced which is effective to perform a controlling operation such as electrical switching of solid-state circuits. In the exemplary system, the noted level detector output control signal, indicative of attainment of near-proximity status, is used to effect circuit closure in one control circuit and to effect circuit opening in a second control circuit. The latter circuits may include indicator means such as lamps, and/or other means.

Adjuncts to the illustrated exemplary system optionally include sensor test-circuit means for facilitating testing of the sensor and associated electronic circuits. In the testing section of the exemplary system, switching means are provided for connecting the noted primary and secondary in a bridge circuit across which is connected an indicator, whereby operability of the sensor means may readily be checked without actuating the primary mechanical means such as the landing gear, and further switching means are provided for deriving a phase-inverted signal and applying it to the phase-detecting circuitry whereby to check the operability of the electronic circuitry.

BRIEF DESCRIPTION OF THE DRAWINGS

FIG. 1 is a circuit block diagram indicating the functional units of the system and the testing adjuncts thereto;

FIG. 2 is a top or face view of a sensor inductive device and target element, with directional indicators showing optional directions of relative movement between target and inductive element, and with a portion broken away to reveal details;

FIG. 3 is a face view of elements depicted in FIG. 2, with the target element shifted away and potting material removed;

FIG. 4 is a sectional view taken as indicated by directors 4—4 in FIG. 3; and

DESCRIPTION OF THE PREFERRED FORM OF THE INVENTION

Figure 5:
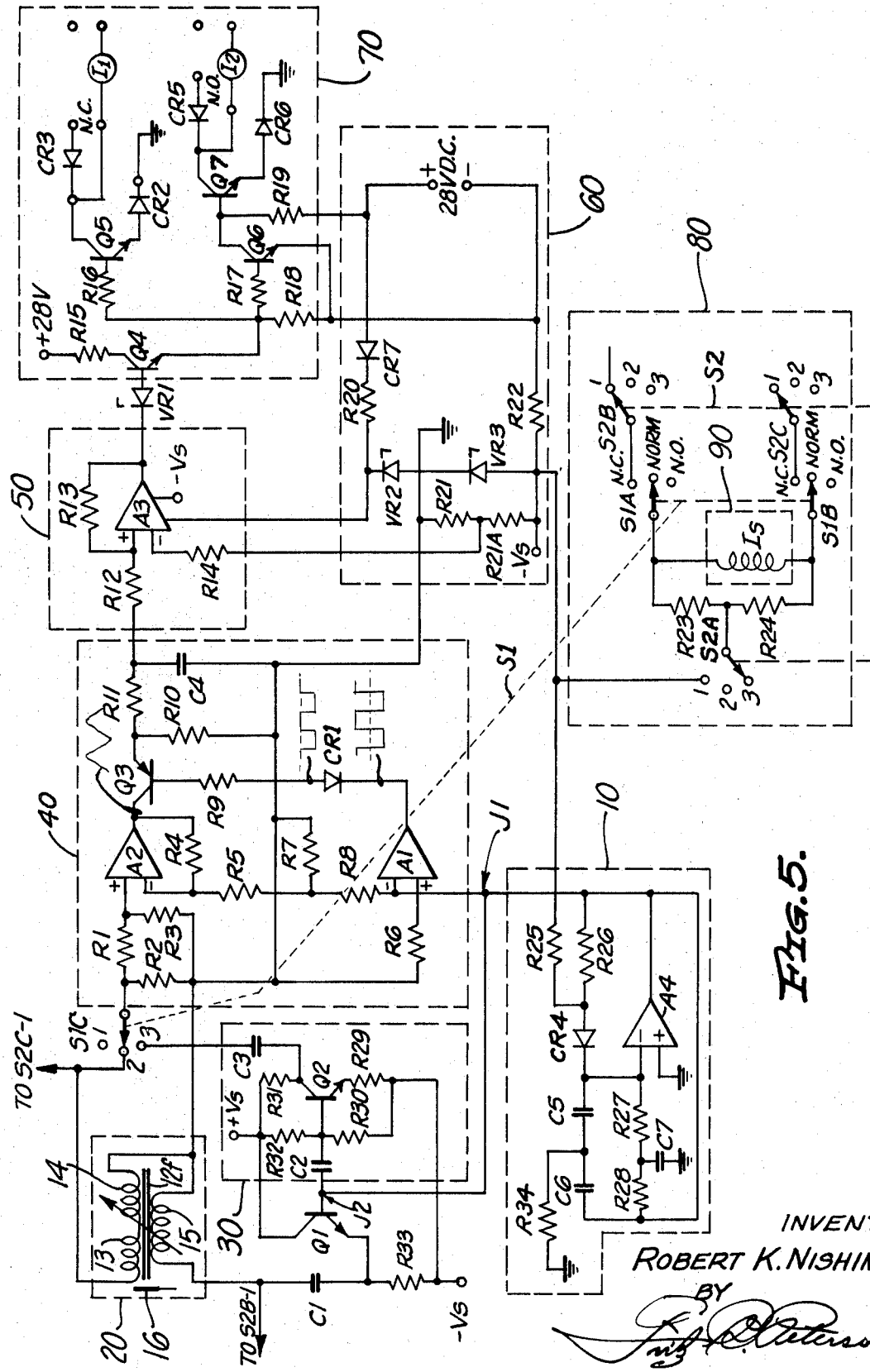
FIG. 5 is a schematic circuit diagram depicting details of the electronic and electrical components and circuitry of the preferred exemplary embodiment of the invention.

The invention, in attaining the primary objective of obviating employment of electrical switches in adverse environments to provide electric signals indicative of movement of a mechanical member to a predetermined position and of providing the aforementioned improvements, is based upon using movement of a magnetic member (herein for convenience called a target) from a first or remote position in which it permits the output of a variably energized electromagnetic device to have a first phase relationship to the input energizing power or signals to a second or proximate position in which it causes a shift to a second phase relationship between the input and output signals. Phase shift detecting means, which may be situated a considerable distance from the electromagnetic device (for example, adjacent to an operator or pilot station), serve to detect the phase shift and to provide an output signal indicative of the change of phase and of movement of the mechanical member to the proximate position. The output signal of the phase detector is utilized, preferably with a signal detector, to control the operation of solid-state switching means and indicator means. The preferred form of electromagnetic means is a differential transformer the primary of which is energized with alternating current power supplied by a source which in this example is an oscillator, the arrangement of the secondary windings and the movable magnetic member being such that when the latter member is in remote status or position the secondary output signal is in phase with the energizing alternating current and when in proximate status or position the output signal is of phase opposite to the energizing current. However, as will be evident to those skilled in the art, the opposite relationship between target positions and input-output phases may be utilized.

In the preferred form of the invention the change of phase relationship between the transformer input and output is detected by phase detecting means the output signal of which is a DC potential the level of which changes incident to the phase change; and the change of level of that output signal is detected by a signal level detector which incident to the noted change occurring, effects or initiates changes in solid-state switching means for energization (or, alternatively, deenergization) of indicator means.

In FIG. 1, the system is depicted in functional unit or block form. An oscillator 10 supplies an AC signal of, for example 2 kilohertz frequency to each of a proximity sensor 20, a phase inverter 30, and a phase detector 40. Switch means S1 as indicated permits connection of detector 40 directly to inverter 30 for testing purposes. The DC output signal of detector 40, which is low or of zero value when the sensor target is remote, and high when the target is proximate, is supplied to a signal level detector 50 which receives stabilized DC reference potential from a DC supply unit 60. When the detector 50 detects a low-level signal from unit 40, the output control signal of unit 50 is, in the illustrated embodiment of circuitry, substantially of zero value; and conversely, when unit 50 detects a high-level signal from unit 40, the output control signal of unit 50 is high. The control signal furnished by detector 50 is fed or supplied to solid-state switch means 70, which comprises in this instance a normally open (N. O.) circuit and a normally closed (N. C.) circuit. The switch circuitry is such that when the control signal from detector 50 is high, the N. O. circuit is closed or closes and the N. C. circuit is open or opens, and when the signal from unit 50 is low, the opposite is true.

A sensor test unit 80 is provided, with switching means as indicated, permitting testing of the circuitry. The circuit comprised in test unit 80 is arranged as a portion of a bridge circuit which comprises as legs the differential transformer primary and secondary windings. Results of operation of the test circuit 80 are made known by an indicator unit 90. The several switching units; and supply of power to unit 60, are as indicated.

The preferred form of exemplary inductive device, a differential transformer, is illustrated in FIGS. 2, 3 and 4. The illustrated inductive device is mounted in a supporting and protective strong boxlike structure 11 which is provided with flanges as shown for convenience in mounting to a portion of the machine in which the sensor is to be used. The structure 11 has a bottom comprising the mounting flanges, and four walls of equal height, and thus provides a cavity in which the transformer may be mounted with protection from mechanical damage. The structure 11 may be variously manufactured, for example by welding a square U-channel to a section of angle iron; but other modes and means, such as casting, may be utilized.

The transformer proper comprises a cuplike can 17 of magnetic material preferably of high permeability, e.g., Mumetal, which can is seated on a pad 11$i$ of nonmagnetic material such as solid electrical insulation. The latter may be Bakelite, or the like, and preferably is adhesively secured to the floor of casing 11. Seated in magnetic can 17 is a bobbin of insulation carrying at its ends respective secondary coils or windings 13 and 14, and therebetween a primary coil or winding 15. The bobbin is made to fit closely in can 17, and preferably is adhesively secured in place therein.

Within the bore of the primary-secondaries bobbin is a tubular internally threaded magnetic core 12$f$ which is initially adjusted to a desired axial position and there held by a preferably nonmetallic screw 12$s$ which extends through casing 11, pad 11$i$ and can 17 as shown in FIG. 4. Following adjustment of the core 12$f$, the otherwise unoccupied space in the casing cavity is filled with durable potting compound 18 as indicated in FIG. 4. Thus the core, can, screw and bobbin with its coils, are all securely anchored in position with the open exposed end of can 17 substantially coplanar with the exposed ends of the walls of the casing. Thus a magnetic-flux circuit through can 17 and core 12$f$ is broken by, or includes, flux-path gaps, one at the inner end of the core and the other between the outer end of the core and the exposed edge of the can. A magnetic target 16, shown carried by a supporting member in the form of a rod 16$a$ by way of example, is movable into proximity to the exposed end of the transformer from a position remote therefrom, and vice versa, by structure movable relative to casing 11 and included in the machinery the position of a moving part of which is to be monitored by the detecting means. When moved into magnetically proximate position as determined by the machine to which the device is applied, the core 12$f$ is adjusted to a position at which the output of the opposed secondary windings reverses phase, and the transformer is potted to fix the core in the adjusted position. Thereafter, phase reversal of the secondaries-output wave occurs when target 16 moves to or from proximate position, the primary being energized as previously indicated and as hereinafter more fully explained in detail. The phase shift occurs due to the change in the ratio of magnetic flux linking the inner secondary winding 13 to that linking the outer winding 14 as the target moves from a magnetically remote position (remote) to a magnetically proximate (proximate) position, or vice versa.

The movable magnetic member or target, 16, is preferably moved in either one or the other of mutually perpendicular directions indicated by the double-ended arrows in FIG. 2, that is, in a plane parallel to and closely adjacent the open face of the casing 11, or substantially perpendicularly thereto. However, as is evident to those skilled in the art, other types and/or directions of movement of target 16 relative to core 12$f$ may be utilized to attain a change in flux-turns linkage from a preponderant linkage with one of the secondary windings to a preponderant linkage with the other as the target is moved from the remote position or attitude to the proximate position or attitude.

Referring to FIG. 5, the circuit details of the previously described principal units are shown, similarly labeled, and with circuit components illustrated in schematic form. As therein indicated, oscillator unit 10 is a phase-shift oscillator utilizing feedback from the output of operational amplifier A4. The basic theory of such oscillators is set out in standard Electronic Engineering texts and manuals, e.g., "Electronic and Radio Engineering" by Terman, McGraw-Hill, 1955, pp. 501 et seq.; "Electronic Measurements" by Terman, McGraw-Hill (2nd ed.), 1952, pp. 482—490; and hence the oscillator will not here be further described. The oscillator unit provides an AC wave at junction J1, the frequency chosen being 2 kilohertz, for example.

The output of oscillator unit 10 is amplified by an amplifier including Q1, and applied to the primary winding 15 of the sensor unit 20 via coupling capacitor C1. The oscillator output is further applied, from junction J2 to phase-inverter unit 30 which as previously indicated may be used, in testing, to supply phase-reversed potential, via switch S1, to the phase detector unit 40. The phase of the output signal of the sensor transformer, relative to the oscillator output signal at junction J1, depends upon whether the target 16 is in proximate or remote position or status relative to core 12f, as previously noted. Both of the noted signals are applied to phase-detector unit 40, the signal from the sensor arriving via contact number 2 of deck S1C of a multiple-deck switch S1, and the signal from the oscillator unit arriving via junction J1. In the phase-detector unit the signal from the oscillator is amplified and squared by amplifier A1 to produce a square wave as indicated by the waveform at the amplifier output line; and the generally sinusoidal signal from the sensor is amplified in amplifier A2. The output signal of amplifier A2 is applied to the collector of PNP transistor (switch) Q3, and the negative-going half-wave of the output signal from amplifier A1 (clipped by diode CR1) is applied to the base of the same transistor. As is evident to those skilled in electronics, when the output signal waves of the two amplifiers are in phase, the current flow through the transistor is of negligible magnitude; but when the two signals are of opposite phase, the negative half-wave of the clipped square wave applied as a bias to the base of Q3 as the collector potential (signal from A2) goes through a positive half-cycle, causes the transistor to conduct heavily. Thus in the latter case, pulses of current flow through transistor Q3. The pulses are integrated by the RC circuit including resistors R11 and C4, and provide a DC potential signal which is applied to the level detector unit 50. The latter unit comprises a differential amplifier A3 which is supplied a constant reference potential from a regulating circuit comprised in a stable reference potential unit 60. The latter unit comprises a DC supply source as indicated.

Thus amplifier A3 is arranged to produce an output signal only when its input signal from unit 40 exceeds a specific amplitude relative to the amplitude of the signal from unit 60; for example, only when the signal from phase-detector unit 40 exceeds that from the reference unit 60. The output line from amplifier A3 is connected to a Zener diode VR1 which, for example, is selected to have a breakdown potential of 8.2 volts in the circuit as characterized in table I and as shown. A switching transistor, Q4, in the switch unit 70, is normally biased off by the absence of positive potential signal on the base thereof. The transistor collector is connected to the + terminal of a power source, and the emitter to the − terminal, as indicated Thus the transistor Q4, to the base of which diode VR1 is connected as shown, remains nonconducting until the output signal from amplifier A3 exceeds 8.2 volts, indicative of phase reversal of the output of sensor unit 20 and hence of arrival of target 16 proximate to core 12b.

Biasing of transistor Q4 to conductive state incident to breakdown of diode VR1 as described results in a positive bias being applied to transistors Q5 and Q6, resulting in both becoming conductive. Current flow through Q5 energizes an indicator I1, which may be a green lamp the lighting of which is indicative of presence of the target 16 in proximate position. Concurrent current flow through Q6 via resistor R19 places a negative-going bias on transistor Q7, which transistor is normally conductive because of + bias supplied via resistor R17. The negative bias causes cutoff of Q7, whereupon previously energized second indicator I2 becomes deenergized. The latter indicator may be a red lamp the lighting of which accordingly indicates that the target 16 is in remote position or status. Since all of the described apparatus except the sensor unit 20, which unit may be well insulated and mechanically well protected, may be remote from the sensor and thus removed from any adverse environment, and since no electrical contacts need be opened or closed in operation of the system, and since the construction of the target and transformer is easily made such as to tolerate misalignment of parts, the previously inferred or obvious objectives are attained. The system is thus characterized by very low sensitivity to electrical "noise"; and by very low sensitivity to large changes of temperature at the sensor location where, in aircraft for example, both extremes of temperature are usual. Also, none of the electronic components is required to meet any critical or extreme specifications; and none of the circuitry requires trimming or readjustment after having been installed and put into operation. The three connections or conductors connected to the sensor unit may be of considerable length, for example several hundred feet. The values of resistors R21 and R21A in the regulating network of the DC reference potential supply are selected in accord with the physical separation of the target 16 to the sensor face at which "triggering" or shift of phase of the output signal is desired to occur. Thus final adjustment, or resetting, of triggering may be effected by change of R21 or R21A.

As is evident from consideration of the circuits of FIG. 4, operation of the sensor may be simulated, for purpose of testing the electronic circuitry, by operating the previously noted plural-deck switch S1 to substitute for the sensor signal at deck S1C a phase-reversed signal provided by phase-inverter unit 30. To test continuity of the sensor windings, plural-deck switches S1 and S2 are operated to connect the sensor windings into a bridge circuit in which primary winding 15 and resistor R23 of test circuit unit 80 are opposed legs and serially connected secondary windings 13—14 and resistor R24 of the test circuit unit are opposed legs. The indicator $I_s$ is connected across the bridge, and constitutes fault indicator unit 90. The values of R23 and R24 are chosen to match the impedances, respectively, of the primary and secondary windings.

As will be evident to those skilled in the electronic instrumentation art, by reversing the relationships of amplifiers A1 and A2 for example, or by using an NPN transistor at Q3 rather than a PNP transistor, and by using a green lamp at I2 and a red lamp at I1, the change of phase relationship between the output signal of the sensor unit and the oscillator output signal can be opposite to the change previously described, with attainment of the same end result. It is only necessary that in moving from remote to proximate positions the target cause a change of phase relationship, either from in-phase to opposite phase, or vice versa, whereby to effect a change in the output signal of one or another of the units to cause a reversal of the energizations of the indicators I1 and I2.

The following tabulation of circuit components and values thereof is exemplary only. Switches and like items are selected in accord with good electronics design principles and practice.

TABLE I

| | |
|---|---|
| R1, 10K | R17, 560Ω |
| R2, 82K | R18, 470Ω |
| R3, 680K | R19, 120Ω |
| R4, 680K | R20, 147Ω |
| R5, 10K | R21, Selectable.[1] |
| R6, 2.7K | R21A, 100K |
| R7, 2.2K | R22, 147Ω |
| R8, 100K | R23, 680Ω [2] |
| R9, 47K | R24, 100Ω [3] |
| R10, 1K | R25, 27K |
| R11, 4.7K | R26, 4.7K |
| R12, 1K | R27, 49.9K |
| R13, 3M | R28, 49.9K |
| R14, 1K | R29, 3.3K |
| R15, 50Ω | R30, 22K |
| R16, 51Ω | R31, 3.3K |

Table I — Continued

| | |
|---|---|
| R32, 47K | CR3, 1N4720 |
| R33, 4.7K | CR4, 1N4148 |
| R34, 22.1K | CR5, 1N4720 |
| A1, Fairchild.[4] | CR6, 1N4720 |
| A2, Fairchild.[4] | CR7, 1N4148 |
| A3, Fairchild.[4] | VR1, 1N5237 |
| A4, Fairchild.[4] | VR2, 1N5237 |
| C1, 1µf | VR3, 1N5237 |
| C2, 1µf | Q1, 2N4401 |
| C3, 1µf | Q2, 2N4401 |
| C4, 4.7µf | Q3, 2N5087 |
| C5, .0015 [5] | Q4, 2N3766 |
| C6, .0015 [5] | Q5, 2N3766 |
| C7, .003 [5] | Q6, 2N3766 |
| CR1, 1N4148 | Q7, 2N3766 |
| CR2, 1N4720 | |

[1] According to desired remoteness of target at triggering point.
[2] Value dependent upon impedance of transformer primary winding.
[3] Value dependent upon impedance of transformer secondary winding.
[4] µA741C.
[5] Silver mica, µf.

I claim:

1. A proximity detection system for detecting whether a movable member is proximate or remote from a selected location, said system comprising:
   first means, including AC wave signal-generating means;
   second means, including a rigid, encased, differential transformer situated at the selected location, said transformer having fixed electrically opposed secondary windings, a stationary, fixed magnetic core and a stationary primary winding connected to said first means to be energized thereby with an applied AC wave signal whereby to enable said transformer to produce an AC output signal, said second means including a movable magnetic member physically separate from said transformer and movable to and from first and second positions respectively proximate to and remote from said location and effective incident to movement from either of said positions to the other to cause inversion of the phase relationship of the output signal thereof to the energizing signal supplied from said first means;
   third means, including phase-detector means, connected to said first means to receive an AC signal from said generating means and connected to said second means to receive the output signal therefrom, said third means effective to provide a signal of high character incident to reversal of phase relationship from a first phase relationship to a second phase relationship between the output signals from said generating means and said second means, and effective to provide a signal of low character incident to the opposite reversal of such phase relationship; and
   fourth means, including controlling means connected to said third means, effective to perform a controlling function incident to change of character of signal from said third means.

2. A proximity-detecting system as defined in claim 1, in which said differential transformer is provided with an exposed face exposing a portion of said core having a nonmagnetic gap in the flux path thereof, and in which said movable member is movable relative to said gap to and from positions respectively proximate to and remote from said core to decrease and increase said gap, respectively, to thereby invert the phase of the secondary winding output potential relative to the phase of the AC wave signal applied from the signal-generating means to said primary winding.

3. A proximity-detecting system according to claim 1, in which said phase-detector means comprise a transistor and first and second amplifier means the outputs of which are connected to bias said transistor to conduct to produce a detector output signal incident to the respective AC signals applied thereto from said generating means and said first means having a selected relative phase relationship selected from among phase opposition and phase coincidence.

4. A proximity-detecting system according to claim 1, in which said differential transformer is provided with an exposed face and in which said core is provided with a nonmagnetic flux-path gap at said face, and in which said movable member is movable adjacent said face to and from positions respectively proximate to and remote from said gap to thereby cause reversal of the phase relationship of the secondary winding AC output signal relative to the AC wave signal applied from the said signal-generating means to the said primary winding, and in which system said phase-detector means comprise a transistor and first and second amplifier means the outputs of which are connected to bias said transistor to conduct to produce a detector output signal incident to the respective AC signals applied thereto from said generating means and from said first means having a selected phase relationship selected from among phase opposition and phase coincidence, said transistor being connected to said fourth means to provide a signal thereto.

5. A proximity-detecting system according to claim 4, in which said first amplifier means comprises wave-squaring means and an output line, said phase-detector means further comprising a diode in the said output line effective to pass only alternate half-cycles of the output of said squaring means, and in which system said second amplifier means comprises a differential amplifier, and in which system the passed half-cycles of the signal from said squaring means are effective to bias said transistor off incident to the output signals of said first and second amplifier means being in phase coincidence.